United States Patent
Wang et al.

(10) Patent No.: US 10,989,065 B2
(45) Date of Patent: Apr. 27, 2021

(54) STEAM TURBINE OVERSPEED PROTECTION SYSTEM, AND STEAM TURBINE

(71) Applicants: CHINA SHENHUA ENERGY COMPANY LIMITED, Beijing (CN); SHENHUA (FUJIAN) ENERGY COMPANY LIMITED, Fujian (CN); SHENHUA (FUZHOU) LUOYUAN BAY PORT&POWER CO., LTD, Fujian (CN)

(72) Inventors: Shumin Wang, Beijing (CN); Yanchao Li, Fujian (CN); Zhijiang Liu, Beijing (CN); Xing Wei, Fujian (CN); Wei Wang, Fujian (CN); Lihua Cao, Jilin (CN); Zhijia Lv, Fujian (CN)

(73) Assignee: CHINA SHENHUA ENERGY COMPANY LIMITED, Beijing (CN)

( * ) Notice: Subject to any disclaimer, the term of this patent is extended or adjusted under 35 U.S.C. 154(b) by 254 days.

(21) Appl. No.: 16/343,115

(22) PCT Filed: Oct. 20, 2017

(86) PCT No.: PCT/CN2017/106951
§ 371 (c)(1),
(2) Date: Apr. 18, 2019

(87) PCT Pub. No.: WO2018/072740
PCT Pub. Date: Apr. 26, 2018

(65) Prior Publication Data
US 2019/0257212 A1    Aug. 22, 2019

(30) Foreign Application Priority Data

Oct. 21, 2016 (CN) .......................... 201610921776.6

(51) Int. Cl.
*F01D 21/02* (2006.01)
*F01D 21/16* (2006.01)

(52) U.S. Cl.
CPC ............. *F01D 21/16* (2013.01); *F01D 21/02* (2013.01); *F05B 2270/1011* (2013.01); *F05B 2270/304* (2013.01)

(58) Field of Classification Search
CPC .......... F01D 21/02; F01D 21/16; F01D 15/12; F16D 41/12
(Continued)

(56) References Cited

U.S. PATENT DOCUMENTS 4,022,429 A * 5/1977 Yonekura .................. B66F 3/02
254/95
6,615,586 B1 * 9/2003 Boric ...................... B63H 21/20
60/729

(Continued)

FOREIGN PATENT DOCUMENTS

CN          202194693 U        4/2012
CN          203175690 U        9/2013
(Continued)

*Primary Examiner* — Woody A Lee, Jr.
*Assistant Examiner* — Behnoush Haghighian
(74) *Attorney, Agent, or Firm* — Baker & Hostetler LLP

(57) ABSTRACT

Provided is a steam turbine overspeed protection system, includes a drive gear arranged to match a rotation speed of a rotor of a steam turbine; a rotating shaft parallel to an axis of the drive gear and capable of rotating at a critical rotation speed; a protective gear arranged on the rotating shaft and forming a lead screw nut mechanism with the rotating shaft, and arranged to be capable of engaging with the drive gear when the rotation speed of the drive gear exceeds the critical rotation speed; and an operating rod connected to the protective gear; wherein, when the drive gear engages with the protective gear, the protective gear can move in the axial direction of the rotating shaft and thereby drive the operating (Continued)

rod to move and produce an action that activates a protection device for preventing steam turbine overspeed.

14 Claims, 1 Drawing Sheet

(58) Field of Classification Search
USPC .................................. 74/438, 457, 460, 462
See application file for complete search history.

(56) References Cited

U.S. PATENT DOCUMENTS

| 7,185,496 | B2* | 3/2007 | Herlihy | F02C 3/107 |
| | | | | 180/301 |
| 7,547,185 | B2* | 6/2009 | Giesler | F01D 15/12 |
| | | | | 184/11.1 |
| 8,283,796 | B2* | 10/2012 | Certain | B64D 35/02 |
| | | | | 290/31 |
| 8,727,335 | B1* | 5/2014 | Vicente, Jr. | F16D 43/16 |
| | | | | 271/10.13 |
| 8,845,489 | B2* | 9/2014 | Vialle | F02C 7/36 |
| | | | | 477/55 |
| 9,011,289 | B2* | 4/2015 | Goleski | F16D 41/12 |
| | | | | 475/277 |
| 9,548,639 | B2* | 1/2017 | Goi | H02K 7/108 |
| 10,704,616 | B2* | 7/2020 | Hsieh | F16D 41/12 |
| 2019/0264760 | A1* | 8/2019 | Peglowski | F16D 41/02 |

FOREIGN PATENT DOCUMENTS

| CN | 203978522 U | 12/2014 |
| CN | 205370660 U | 7/2016 |
| CN | 105952500 A | 9/2016 |
| CN | 106285798 A | 1/2017 |
| JP | 55-134705 A | 10/1980 |

* cited by examiner

STEAM TURBINE OVERSPEED PROTECTION SYSTEM, AND STEAM TURBINE

CROSS-REFERENCE TO RELATED APPLICATIONS

This application is a National Stage of International patent application PCT/CN2017/106951, filed on Oct. 20, 2017, which claims priority to foreign Chinese patent application No. CN 201610921776.6, filed on Oct. 21, 2016, the disclosures of which are incorporated by reference in their entirety.

FIELD OF THE INVENTION

The present invention relates to the technical field of power plant steam turbine safety, particularly to a steam turbine overspeed protection system and a steam turbine.

BACKGROUND

Steam turbine overspeed may cause extremely high damages, and thus has drawn high attention from technicians. At present, steam turbine overspeed protection devices are implemented in two manners: electronic overspeed protection and conventional mechanical overspeed protection.

An electronic overspeed protection system is configured to measure the actual operating rotation speed of a steam turbine-generator set by means of an electronic speed measuring system, generate an analog signal and send it to a control system, in which a logical module operates and identifies the analog signal. When the rotation speed reaches a critical rotation speed (e.g., 3,300 rpm) or above, the control system will issue an automatic shutdown command to realize shutdown protection of the steam turbine. In such a case, if any problem occurs during measuring the rotation speed, protective action refused and protective action error accidents will happen very easily in the system.

In a conventional mechanical overspeed protection system, a fly-weight or fly-ring with certain mass is usually mounted at an end of the rotor. When the rotor operates at a rotation speed lower than the critical rotation speed (e.g., 3,300 rpm), the fly-weight or fly-ring will be restrained by a spring. When the rotation speed of the rotor reaches 3,300 rpm or above, a increased centrifugal force of the fly-weight or fly-ring will overcome the restraining force of the spring and make the fly-weight or fly-ring displace a certain distance, so that it may impact a protective stay hook. The protective stay hook works with other components in the mechanical overspeed protection system to release the pressure in the control oil system and accomplish a shutdown action. However, the reliability of the aforementioned system mainly depends on the quality of the spring, such as the manufacturing accuracy, coefficient of stiffness, and stability of the spring, which has a great influence on the system. In addition, periodical tests are required to verify the reliability of the system. The equipment may trip in the case of mal-function or mal-operation of any component in the online test process. Therefore, there is still a room for improvement to the reliability of conventional mechanical overspeed protection systems.

At present, there is no prior art providing a mechanical steam turbine overspeed protection system, in which the spring and fly-weight/fly-ring could be replaced by other components.

SUMMARY OF THE INVENTION

The object of the present invention is to provide an apparatus, which is further developed on the basis of a conventional mechanical overspeed protection system to improve the reliability of the overspeed protection system.

To achieve the above object, according to one aspect of the present invention, it provides a steam turbine overspeed protection system, comprising: a drive gear arranged to match a rotation speed of a rotor of a steam turbine; a rotating shaft parallel to an axis of the drive gear and capable of rotating at a critical rotation speed; a protective gear arranged on the rotating shaft and forming a lead screw nut mechanism with the rotating shaft, and arranged to be capable of engaging with the drive gear when the rotation speed of the drive gear exceeds the critical rotation speed; and an operating rod that can be connected to the protective gear; wherein, when the drive gear engages with the protective gear, the protective gear can move in the axial direction of the rotating shaft and thereby drive the operating rod to move and produce an action that activates a protection device for preventing steam turbine overspeed.

Preferably, the protective gear is designed as a ratchet structure.

Preferably, the protective gear comprises a wheel-shaped main body and movable teeth arranged on an outer rim of the wheel-shaped main body, the movable teeth are arranged to be capable of swing around an axis of the protective gear in a circumferential direction, so that the protective gear could be retained in an idle position or action position.

Preferably, limit stops are arranged on the protective gear, the movable teeth are movably connected to the protective gear by means of position retaining shafts, each of the movable tooth comprises a first end that can extend into a space between two adjacent teeth of the drive gear, and a second end configured to fit with a corresponding limit stop to retain the movable teeth in the action position.

Preferably, the limit stops are projections that are formed integrally with the wheel-shaped main body of the protective gear and protrude from the surface of the wheel-shaped main body.

Preferably, the steam turbine overspeed protection system further comprises an electric motor configured to drive the rotating shaft.

Preferably, the electric motor outputs power to the rotating shaft via a gearbox.

Preferably, the steam turbine overspeed protection system further comprises a connecting part designed as a cylindrical sleeve, the connecting part is integrally formed with the protective gear, and provided with a connecting hole that fits with the operating rod when the protective gear moves in the axial direction.

Preferably, the steam turbine overspeed protection system further comprises a position switch arranged on the connecting part and configured to detect the axial movement of the protective gear.

Preferably, the steam turbine overspeed protection system further comprises a reset device capable of resetting the protective gear.

Preferably, the critical rotation speed is a maximum rotation speed of the rotor at which the steam turbine can operate safely.

Preferably, the drive gear is formed by providing teeth on the circumference of the rotor.

Preferably, the steam turbine overspeed protection system comprises the protection device, the protection device comprises a protective stay hook, and the protective stay hook is pulled when the operating rod is displaced in the axial direction, so that the protective stay hook is released.

According to another aspect, the present invention further provides a steam turbine that comprises the aforementioned steam turbine overspeed protection system.

By arranging a drive gear and a protective gear and configuring the protective gear to engage with the drive gear when the rotation speed of the drive gear is higher than the critical rotation speed, by means of the rotation of the drive gear in the circumferential direction, the protective gear can be displaced to the left in the axial direction along the rotating shaft and thereby drive the operating rod to trigger a protective action. In the technical scheme of the present invention, a protective action is triggered by means of the axial movement of the protective gear, which is essentially different from the conventional overspeed protection systems that rely on centrifugal force change, and thus has higher reliability.

Other features and advantages of the present invention will be further set forth in the following detailed description of the embodiments.

BRIEF DESCRIPTION OF DRAWINGS

The accompanying drawings are provided herein to facilitate further understanding of the present invention, and constitute a part of this description. The drawings are used in conjunction with the following embodiments to explain the present invention, but shall not be interpreted as constituting any limitation to the present invention.

In the figures.

Figure 1:
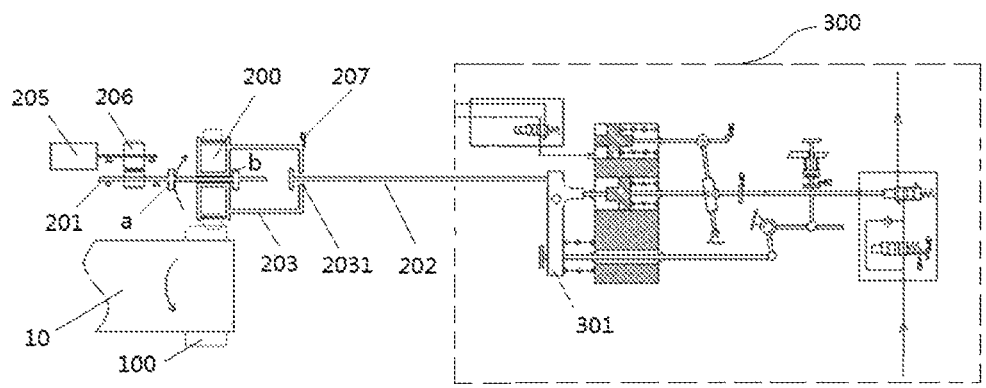
FIG. 1 is a schematic structural diagram of the steam turbine overspeed protection system according to an embodiment of the present invention.

| Reference Signs: | | | |
|---|---|---|---|
| 10 | Rotor of steam turbine | 100 | Drive gear |
| 200 | Protective gear | 201 | Rotating shaft |
| 202 | Operating rod | 203 | Connecting part |
| 204 | Limit stop | 205 | Electric motor |
| 206 | Gearbox | 207 | Position switch |
| 210 | Normal tooth | 220 | Movable tooth |
| 220a | First end | 220b | Second end |
| 230 | Position retaining shaft | 300 | Protection device |
| 301 | Protective stay hook | 2031 | Connecting hole |
| I | Idle position | II | Action position |
| a | First position of rotating shaft | b | Second position of rotating shaft |

DETAILED DESCRIPTION

Some embodiments of the present invention will be detailed with reference to the accompanying drawings in below. It should be understood that the embodiments described here are only provided to describe and explain the present invention rather than constitute any limitation to the present invention.

The steam turbine overspeed protection system accoding to the present invention comprises: a drive gear 100, a protective gear 200, a rotating shaft 201, and an operating rod 202. The drive gear 100 is arranged to match a rotation speed of a rotor 10 of a steam turbine. The rotating shaft 201 is parallel to an axis of the drive gear 100 and capable of rotating at a critical rotation speed. The protective gear 200 is arranged on the rotating shaft 201 and forms a lead screw nut mechanism with the rotating shaft 201, and the protective gear 200 is also arranged to be capable of engaging with the drive gear 100 when the rotation speed of the drive gear 100 exceeds the critical rotation speed. The operating rod 202 can be connected to the protective gear 200. When the drive gear 100 engages with the protective gear 200, the protective gear 200 can move in the axial direction of the rotating shaft 201 and thereby drive the operating rod 202 to move and produce an action that activates a protection device 300 for preventing steam turbine overspeed.

To activate the protection device 300 accurately, the protective gear 200 is designed as a ratchet structure. When the rotation speed of the drive gear 100 is lower than the critical rotation speed, the protective gear 200 will rotate with respect to the drive gear 100, the teeth on the protective gear 200 will be in light contact with the drive gear 100, and the protective gear 200 will be in an idle state. When the rotation speed of the drive gear 100 is higher than the critical rotation speed, the drive gear 100 will engage with the protective gear 200, the protective gear 200 will bear the rotational torque from the drive gear 100 and move to the left in the axial direction of the rotating shaft 201, and thereby drive the operating rod 202 so that the steam turbine protection device 300 will be released.

Furthermore, a relationship similar to the relationship between bolt and nut is established between the protective gear 200 and the rotating shaft 201. Specifically, as shown in FIG. 1, a first thread structure is arranged between a first rotating shaft position a and a second rotating shaft position b on the rotating shaft 201, a second thread structure that matches the first thread structure is formed on a fitting surface of the protective gear 200 that is fitted with the rotating shaft 201. Therefore, when the protective gear 200 bears the torque transferred from the drive gear 100, the protective gear 200 can move along the rotating shaft 201 from the second rotating shaft position b to the first rotating shaft position a.

Figure 2:
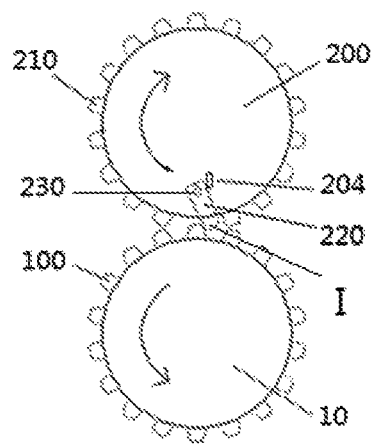
FIG. 2 is a schematic diagram of the steam turbine overspeed protection system according to an embodiment of the present invention, in which the protective gear of the overspeed protection system is in an idle state with respect to the drive gear.
Figure 3:
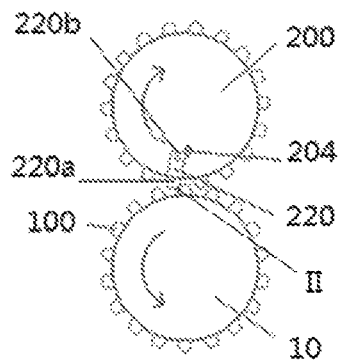
FIG. 3 is a schematic diagram of the protective gear and the drive gear in FIG. 2 in a state that the protective gear and the drive gear are engaged to take actions.

To ensure that the protective gear 200 can engage with the drive gear 100 accurately when the protective gear 200 acts, as shown in FIGS. 2 and 3, the protective gear 200 is configured to comprise a wheel-shaped main body and a plurality of movable teeth 220 arranged on an outer rim of the wheel-shaped main body. The movable teeth 220 are configured to swing unidirectionally to a certain extent in the circumferential direction of the protective gear 200, to retain the protective gear 200 in an idle position I or action position II. Specifically, the relationship between the movable teeth 220 of the protective gear 200 and drive gear 100 is so configured, that the movable teeth 220 of the protective gear 200 can contact with the drive gear 100 lightly or engage with the drive gear 100, according to the rotation speeds of the two gears in relation to each other.

During the operating process of the steam turbine, the protective gear 200 is kept rotating at the critical rotation speed. When the rotation speed of the drive gear 100 is lower than the critical rotation speed, the protective gear 200 will rotate with respect to the drive gear 100, the movable teeth 220 will contact with the drive gear 100 lightly, and the protective gear 200 will be in the idle position I. When the rotation speed of the drive gear 100 (i.e., the rotation speed of the steam turbine) is higher than the critical rotation speed, the drive gear 100 will rotate with respect to the protective gear 200, the movable teeth 220 will engage with the drive gear 100, the drive gear 100 will transfer torque to the protective gear 200, and the protective gear 200 will be in the action position H.

To ensure the stability of the protective gear 200 in the action position II and make the protective gear 200 bear the torque and move along the rotating shaft 201 in a better way, limit stops 204 are arranged on the protective gear 200, and the movable teeth 220 are movably connected to the protective gear 200 by means of position retaining shafts 230. Each of the movable teeth 220 comprises a first end 220a that can extend into a space between two adjacent teeth on the drive gear 100 and a second end 220b configured to fit with a corresponding limit stop 204 so as to retain the movable teeth 220 in the action position H. Preferably, the limit stops 204 are projections that are formed integrally with the wheel-shaped main body of the protective gear 200 and protrude from the surface of the wheel-shaped main body. Therefore, when the second end 220b of a movable tooth 220 acts with a corresponding limit stop 204, the movable tooth 220 will be reset to a state of normal tooth 210, so that the drive gear 100 will engage with the protective gear 200. Furthermore, when the second end 220b bears the torque from the drive gear 100, the movable teeth 220 will not swing around the position retaining shaft 230, since the first end 220a of the movable tooth 220 is restrained by the corresponding limit stop 204. When the movable tooth 220 does not swing with respect to the position retaining shaft 230 but is retained at a fixed position, the movable tooth 220 will be equivalent to a lengthened fixed tooth. The movable tooh 220 bears the torque from the drive gear 100 and transfers the torque to the protective gear 200, so that the protective gear 200 can work.

It should be noted that the protective gear 200 is kept rotating at the critical rotation speed during the operating process of the steam turbine. The rotation speed of the steam turbine is the rotation speed of the rotor 10 of the steam turbine, and the rotation speed of the rotor 10 of the steam turbine is the same as the drive gear 100. The drive gear 100 is formed by arranging teeth on the circumference of the rotor 10 of the steam turbine, or the drive gear 100 is a separate gear coaxial with the rotor 10 of the steam turbine.

To keep the protective gear 200 rotating at the critical rotation speed during the operating process of the steam turbine, the protection system further comprises an electric motor 205 that drives the rotating shaft 201. Furthermore, the electric motor 205 outputs power to the rotating shaft 201 via a gearbox 206, so as to drive the rotating shaft 201 to rotate at the critical rotation speed.

Furthermore, the steam turbine overspeed protection system further comprises a connecting part 203 designed as a sleeve. The connecting part 203 is integrally formed with the protective gear 200 and provided with a connecting hole 2031, wherein the connecting hole 2031 is used to fit with the operating rod 202 when the protective gear 200 moves in the axial direction. In such a case, as shown in FIG. 1, when the protective gear 200 is in the idle state, the operating rod 202 will not be connect with the connecting part 203, and thus the operating rod 202 will be in a still state. When the protective gear 200 is in the action state, since the protective gear 200 moves to the left along the rotating shaft 201, an end of the operating rod 202 will be fitted with the connecting hole 2031 and the operating rod 202 will be driven.

To inform the operator that the steam turbine is shut down due to overspeed rather than any other mal-function, in a specific embodiment of the present invention, the steam turbine overspeed protection system further comprises a position switch 207 arranged on the connecting part 203 for detecting the axial movement of the protective gear 200. When the protective gear 200 moves in the axial direction along the rotating shaft 201, the protective gear 200 will drive the connecting part 203 to move together; at that point, the contact point of the position switch 207 is changed, and the position switch 207 works with the control system of the steam turbine to inform the operator that the steam turbine is shut down due to an overspeed protection action of the machine.

To ensure the protective gear 200 can operate normally again after restart of the machine, the steam turbine overspeed protection system further comprises a reset device capable of resetting the protective gear 200.

In the present invention, the critical rotation speed is a maximum rotation speed of the rotor at which the steam turbine can operate safely. Preferably, the critical rotation speed is 3,300 rpm.

As shown in FIG. 1, the steam turbine overspeed protection system comprises a protection device 300, which comprises a protective stay hook 301; the protective stay hook 301 can be connected with or disconnected from the operating rod 202 when the operating rod 202 acts. Since the structure of the protection device 300 is a mechanical structure in the prior art, the specific structure of the protection device 300 is not detailed herein.

The present invention further provides a steam turbine that comprises the aforementioned steam turbine overspeed protection system.

In summary, in an embodiment of the present invention, at an end of the rotor 10 of the steam turbine, a gear in a certain shape is worked out as a drive gear 100. A protective gear 200 is provided at a position on the periphery of the drive gear 100 in parallel to the rotor 10 of the steam turbine in the axial direction. The protective gear 200 is configured to rotate at a critical rotation speed (e.g., 3,300 rpm), and have the same function as a ratchet wheel. When the rotation speed of the steam turbine is higher than the critical rotation speed, the drive gear 100 will engage with the protective gear 200 accurately. The protective gear 200 is thread-fitted with its driving shaft (the rotating shaft 201) and bears torque, so that it can rotate freely and move in the axial direction along the driving shaft, i.e. the relationship between the protective gear 200 and its driving shaft is similar to the relationship between bolt and nut. When the protective gear 200 is displaced to a certain extent, a link rod (the operating rod 202) can be pulled, so that the stay hook 301 of the steam turbine protection device 300 is released, a mechanical slide valve is changed from a closed position to an open position, and thereby the pressure in the control oil system is released and the steam turbine is shut down.

The overspeed protection system according to the present invention does not require any spring component and online test, and thereby improves the operation reliability of the protection system. Moreover, the present invention may be implemented in the following way alternatively: the protective gear 200 is manufactured as a sleeve and covers the drive gear 100, and movable teeth 220 are arranged on the inner side of the protective gear 200, thus, the same protection function can also be realized. In such a case, a small exciting force generated when the movable teeth 220 idling around the drive gear 100 is more uniformly distributed on the turbine shafting.

While some preferred embodiments of the present invention are described above with reference to the accompanying drawings, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described according to above specific embodiments may be combined in any appropriate form, provided that there is no conflict among them. To avoid unnecessary repetition, various possible combinations are not described specifically in the present invention.

Moreover, different embodiments of the present invention may also be combined freely as required, as long as the combinations do not deviate from the ideal and spirit of the present invention. However, such combinations shall also be deemed as falling into the scope disclosed in the present invention.

The invention claimed is:

1. A steam turbine overspeed protection system, wherein, the steam turbine overspeed protection system comprises:
   a drive gear, the drive gear is arranged to match a rotation speed of a rotor of a steam turbine;
   a rotating shaft, the rotating shaft is parallel to an axis of the drive gear and capable of rotating at a critical rotation speed;
   a protective gear, the protective gear is arranged on the rotating shaft and forms a lead screw nut mechanism with the rotating shaft, and the protective gear is arranged to engage with the drive gear when the rotation speed of the drive gear exceeds the critical rotation speed; and
   an operating rod capable of being connected to the protective gear;
   wherein, when the drive gear engages with the protective gear, the protective gear moves in the axial direction of the rotating shaft and thereby drives the operating rod to move and produce an action that activates a protection device for preventing steam turbine overspeed.

2. The steam turbine overspeed protection system according to claim 1, wherein, the protective gear is designed as a ratchet structure.

3. The steam turbine overspeed protection system according to claim 2, wherein, the protective gear comprises a wheel-shaped main body and movable teeth arranged on an outer rim of the wheel-shaped main body, the movable teeth are arranged to be capable of swing around an axis of the protective gear in a circumferential direction, so that the protective gear could be retained in an idle position (I) or action position (II).

4. The steam turbine overspeed protection system according to claim 3, wherein, limit stops are arranged on the protective gear the movable teeth are movably connected to the protective gear by means of position retaining shafts, each of the movable teeth comprises a first end that can extend into a space between two adjacent teeth on the drive gear and a second end configured to fit with a corresponding limit stop to retain the movable teeth in the action position (II).

5. The steam turbine overspeed protection system according to claim 4, wherein, the limit stops are projections that are formed integrally with the wheel-shaped main body of the protective gear and protrude from the surface of the wheel-shaped main body.

6. The steam turbine overspeed protection system according to claim 1, wherein, the steam turbine overspeed protection system comprises an electric motor configured to drive the rotating shaft.

7. The steam turbine overspeed protection system according to claim 6, wherein, the electric motor outputs power to the rotating shaft via a gearbox.

8. The steam turbine overspeed protection system according to claim 1, wherein, the steam turbine overspeed protection system comprises a connecting part designed as a cylindrical sleeve, the connecting part is integrally formed with the protective gear and the connecting part is provided with a connecting hole that fits with the operating rod when the protective gear moves in the axial direction.

9. The steam turbine overspeed protection system according to claim 8, wherein, the steam turbine overspeed protection system comprises a position switch arranged on the connecting part and configured to detect the axial movement of the protective gear.

10. The steam turbine overspeed protection system according to claim 1, wherein, the steam turbine overspeed protection system comprises a reset device capable of resetting the protective gear.

11. The steam turbine overspeed protection system according to claim 1, wherein, the critical rotation speed is a maximum rotation speed of the rotor at which the steam turbine can operate safely.

12. The steam turbine overspeed protection system according to claim 1, wherein, the drive gear is formed by providing teeth on the circumference of the rotor.

13. The steam turbine overspeed protection system according to claim 1, wherein, the steam turbine overspeed protection system comprises the protection device, the protection device comprises a protective stay hook, and the protective stay hook is pulled when the operating rod is displaced in the axial direction, so that the protective stay hook is released.

14. A steam turbine, wherein, the steam turbine comprises a steam turbine overspeed protection system, the steam turbine overspeed protection system comprises:
   a drive gear, the drive gear is arranged to match a rotation speed of a rotor of a steam turbine;
   a rotating shaft, the rotating shaft is parallel to an axis of the drive gear and capable of rotating at a critical rotation speed;
   a protective gear, the protective gear is arranged on the rotating shaft and forms a lead screw nut mechanism with the rotating shaft, and the protective gear is arranged to engage with the drive gear when the rotation speed of the drive gear exceeds the critical rotation speed; and
   an operating rod capable of being connected to the protective gear;
   wherein, when the drive gear engages with the protective gear, the protective gear moves in the axial direction of the rotating shaft and thereby drives the operating rod to move and produce an action that activates a protection device for preventing steam turbine overspeed.

* * * * *